Dec. 4, 1934.  P. BOURQUE  1,983,118
COOKING VESSEL
Filed July 28, 1933
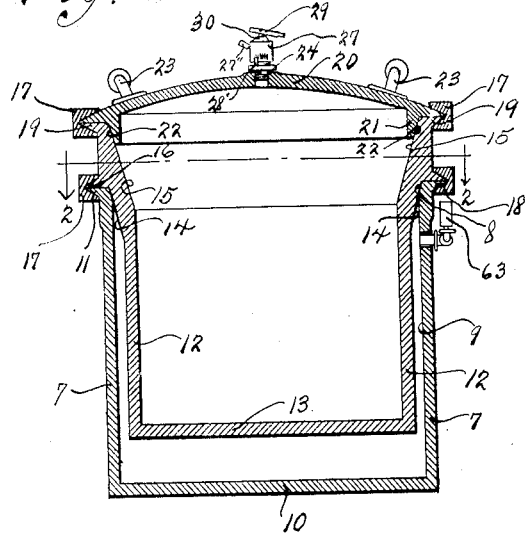
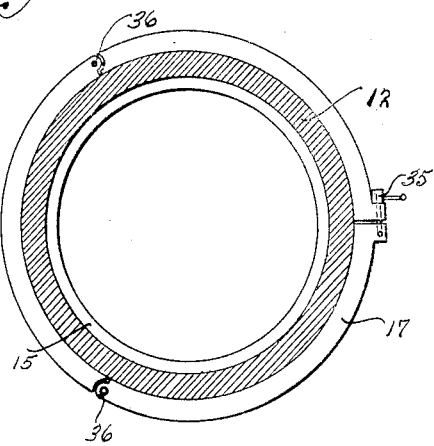
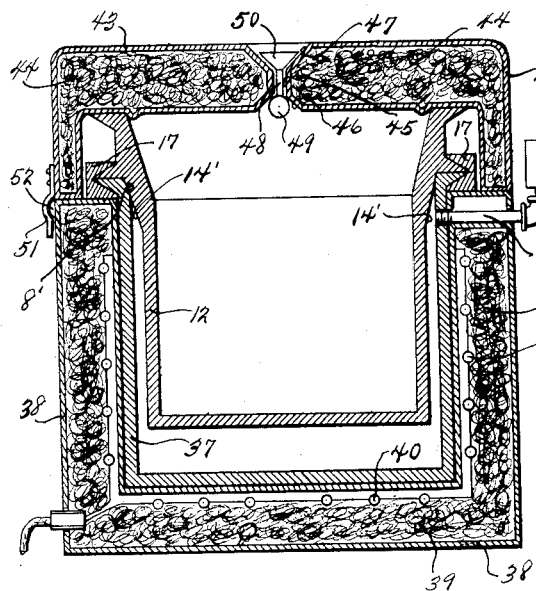
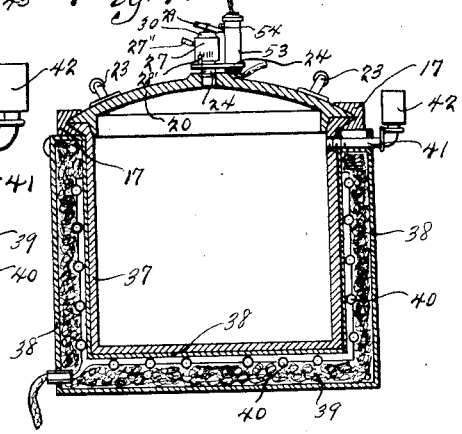
INVENTOR.
Philip Bourque
BY
ATTORNEY.

Patented Dec. 4, 1934

1,983,118

UNITED STATES PATENT OFFICE 1,983,118

COOKING VESSEL

Philip Bourque, Detroit, Mich.

Application July 28, 1933, Serial No. 682,598

6 Claims. (Cl. 53—11)

My invention relates to a new and useful improvement in a cooking vessel and has for its object the provision of a vessel which may be used either as a pressure cooker or as a steam kettle at will.

Another object of the invention is the provision of a kettle of this class having a plurality of interchangeable receptacles and provided with a cover adapted for seating on either of said receptacles.

Another object of the invention is the provision of a securing means which may be used to secure the cover in steam tight relation to the container on which mounted or which may be used to secure a pair of containers in telescoping relation and provide a steam tight connection at the point of engagement.

Another object of the invention is the provision of a cooking vessel of this class which will be simple in structure, economical of manufacture, durable, and highly efficient in use.

Another object of the invention is the provision of means whereby steam may be retained until a predetermined pressure is reached and whereupon upon a release of the retaining means, a switch controlling the electric heating element will be operated to shut off the current.

Other objects will appear hereinafter.

The invention consists in the combination and arrangement of parts hereinafter described and claimed.

The invention will be best understood by a reference to the accompanying drawing which forms a part of this specification, and in which, Fig. 1 is a central, vertical, sectional view of the invention.

Fig. 2 is a sectional view taken on line 2—2 of Fig. 1.

Fig. 3 is a central, vertical view of a slightly modified form of the invention.

Fig. 4 is a view similar to Fig. 3 on a reduced scale, showing some of the parts replaced.

In the form shown in Fig. 1 I provide an outer receptacle having the side wall 7 provided at its upper end with the inclined inner surface 8 terminating in the axially directed surface 9 which extends to the bottom 10. Projecting outwardly from the periphery of the upper edge of the receptacle 7 is the flange 11, wedge-shaped in cross section, the upper surface thereof being parallel to the bottom 10 and the under surface inclined. An inner receptacle is provided having the side wall 12 and the bottom 13. The side wall 12 terminates adjacent its upper end with the inclined peripheral surface 14 which is adapted to extend parallel to and engage the inclined surface 8 when the receptacles are in the relative position shown in Fig. 1. The inner surface of the major portion of this receptacle extends axially, but the upper portion 15 is inclined to the axis. Projecting outwardly from the upper portion is the flange 16 which is wedge-shaped in cross section, and adapted to lie upon the flange 11. A retaining ring 17 which is formed from a plurality of sections hinged together as at 36 and adapted to be clamped around the flanges 11 and 16 by the bolt 35 is provided on its inner surface with the wedge-shaped groove 18 in which these flanges 11 and 16 engage. The formation is such that as the ring is drawn to smaller diameter so as to ride over the inclined faces 11 and 16, these flanges are securely clamped against each other to form a leak-tight connection so that steam may be generated in the space between the receptacles. The upper end of the inner receptacle also terminates in an outwardly projecting flange 19 which is wedge shaped in cross section, having the inclined surface and a horizontal upper surface. The inner surface 15 is adapted to be engaged with the inclined surface 22 of the inwardly projecting flange 21 which extends inwardly from the inner surface of the cover 20. Handles 23 are mounted on this cover. A similar ring 17 is clamped about the wedge 19 of the inner receptacle and the edge of the cover 20.

A relief valve is also mounted on the cover 20. This relief valve and bodies that plug 24, which is threaded into the cover 20 so as to communicate the interior of a shell 27 with the interior of the container. An indicating Figure 28' is used in conjunction with the shell 27 and mounted on this shell 27 is a suitable siren or whistle 27". A stem projects through the top 30 of the shell and carries a suitable switch operating arm 29. Since this valve forms no specific part of the invention itself, a detailed description of the same is not given.

When it is desired to use the device as a steam cooker, the pressure may be built up in the space between the receptacles 7 and 12 and a suitable gauge 63 will serve to indicate the amount of pressure, this gauge also serving as a relief vent or poppet valve to permit escape of steam when the pressure becomes excessive. When it is desired to dispense with the container 12, the same may be removed and the cover 20 seated upon the flange 11, the same binding ring serving in each instance to bind the cover in position.

In the form shown in Fig. 3, I have shown an insulated construction in which the container 12 is used positioned within the container 37 having the inclined surface 8' engaging the inclined surface 14' of the container 12. The flanges are as illustrated in Fig. 1 with the same type of binding ring 17. Embracing the container 37 is a housing 38 which has insulation 39 packed therein around the electric heating element 40. A pipe 41 communicates with the interior of the container 37 and extends exterior of the outer casing to the gauge and poppet valve 42. An insulating cover embodies the shell 43 and the insulation 44. A passage 45 is formed through this cover and slidable therein is the stem 48 which carries at its lower end the ball 49 adapted to engage the seat 46 and at its upper end the head 50 adapted to engage the inclined recess 47. When the cover 43 is used, the ball 49 will move onto its seat in order to maintain pressure when a predetermined pressure has been reached. Spring clips 51 are carried by the cover 43 adapted to fasten over the bead 52 carried by the insulating casing 38. In both forms of the construction, the container 12 may be used or dispensed with at will, and a construction is provided in which the device may be formed into a pressure cooker or a steam kettle without mutilating or marring or requiring the adjustment of any of the parts.

While I have illustrated and described the preferred form of construction of my invention, I do not wish to limit myself to the precise details of structure shown, but desire to avail myself of such variations and modifications as may come within the scope of the appended claims.

Having thus described my invention, what I claim as new and desire to secure by Letters Patent is:

1. In combination, an outer cup-shaped receptacle; an outwardly projecting peripheral flange on the open end of said receptacle; an inner cup-shaped receptacle adapted for engaging throughout the major portion of its body within said outer receptacle and in spaced relation thereto, the open end of said inner receptacle terminating with the same outside diameter as said outer receptacle; and an outwardly projecting peripheral flange on said inner receptacle adapted for overlying and engaging the flange on said outer receptacle.

2. In combination, an outer cup-shaped receptacle; an outwardly projecting peripheral flange on the open end of said receptacle; an inner cup-shaped receptacle adapted for engaging throughout the major portion of its body within said outer receptacle and in spaced relation thereto, the open end of said inner receptacle terminating with the same outside diameter as said outer receptacle; an outwardly projecting peripheral flange on said inner receptacle adapted for overlying and engaging the flange on said outer receptacle; and means for clamping said flanges in engagement with each other to effect a sealing.

3. In combination, an outer cup-shaped receptacle; an outwardly projecting peripheral flange on the open end of said receptacle; an inner cup-shaped receptacle adapted for engaging throughout the major portion of its body within said outer receptacle and in spaced relation thereto, the open end of said inner receptacle terminating with the same outside diameter as said outer receptacle; an outwardly projecting peripheral flange on said inner receptacle adapted for overlying and engaging the flange on said outer receptacle; a second outwardly projecting peripheral flange on said open end of said inner receptacle; a cover adapted for positioning on either of said receptacles as a closure, said cover being adapted for overlying the flange on the open end of the receptacle.

4. In combination, an outer cup-shaped receptacle; an outwardly projecting peripheral flange on the open end of said receptacle; an inner cup-shaped receptacle adapted for engaging throughout the major portion of its body within said outer receptacle and in spaced relation thereto, the open end of said inner receptacle terminating with the same outside diameter as said outer receptacle; an outwardly projecting peripheral flange on said inner receptacle adapted for overlying and engaging the flange on said outer receptacle; a second outwardly projecting peripheral flange on said open end of said inner receptacle; a cover adapted for positioning on either of said receptacles as a closure, said cover being adapted for overlying the flange on the open end of the receptacle, the inner surface of each receptacle at its open end being inclined to its axis; and an axially directed flange on said cover having its periphery inclined to its axis and adapted for engaging the inclined surface of the receptacle with which used.

5. In combination, an outer cup-shaped receptacle having its inner surface adjacent its open end inclined to its axis; an outwardly projecting peripheral flange on said open end; an inner cup-shaped receptacle projectable into said outer receptacle and spaced therefrom, the open end of said inner receptacle being enlarged to the same outside diameter as said outer receptacle and having an inclined peripheral surface engageable with said inclined surface of said outer receptacle; a peripheral flange on said inner receptacle intermediate its end engageable with the end face of said outer receptacle and adapted for overlying the flange on said outer receptacle; and means for binding said receptacles together in sealing relation to provide a fluid-tight chamber between said receptacles.

6. In combination, an outer cup-shaped receptacle having its inner surface adjacent its open end inclined to its axis; an outwardly projecting peripheral flange on said open end; an inner cup-shaped receptacle projectable into said outer receptacle and spaced therefrom, the open end of said inner receptacle being enlarged to the same outside diameter as said outer receptacle and having an inclined peripheral surface engageable with said inclined surface of said outer receptacle; a peripheral flange on said inner receptacle intermediate its end engageable with the end face of said outer receptacle and adapted for overlying the flange on said outer receptacle; means for binding said receptacles together in sealing relation to provide a fluid-tight chamber between said receptacles; and vent means mounted on said outer receptacle for venting said chamber.

PHILIP BOURQUE.